US010928850B2

(12) United States Patent
Chen et al.

(10) Patent No.: US 10,928,850 B2
(45) Date of Patent: Feb. 23, 2021

(54) FIRST IN AND FIRST OUT APPARATUS AND DRIVING METHOD THEREOF

(71) Applicant: Realtek Semiconductor Corporation, Hsinchu (TW)

(72) Inventors: Huan-Wen Chen, Zhubei (TW); Po-Hsien Wu, Hsinchu (TW); Li-Yu Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 188 days.

(21) Appl. No.: 16/394,313

(22) Filed: Apr. 25, 2019

(65) Prior Publication Data

US 2020/0341504 A1 Oct. 29, 2020

(51) Int. Cl.
*G06F 1/12* (2006.01)
*G06F 1/06* (2006.01)
(52) U.S. Cl.
CPC . *G06F 1/12* (2013.01); *G06F 1/06* (2013.01)
(58) Field of Classification Search
CPC ............. G06F 1/12; G06F 1/06; H04L 7/0016
See application file for complete search history.

(56) References Cited

U.S. PATENT DOCUMENTS

| 2006/0277329 | A1* | 12/2006 | Paulson | G06F 5/10 |
| | | | | 710/39 |
| 2012/0239870 | A1 | 9/2012 | Tung et al. | |
| 2013/0007314 | A1 | 1/2013 | Tung et al. | |
| 2020/0126993 | A1* | 4/2020 | Narui | G11C 11/4074 |

* cited by examiner

*Primary Examiner* — Stefan Stoynov
(74) *Attorney, Agent, or Firm* — Locke Lord LLP; Tim Tingkang Xia, Esq.

(57) ABSTRACT

A FIFO apparatus includes write registers, a first control circuit, a multiplexer, and a second control circuit. The write registers are for receiving an input signal and the first clock signal, and outputting first outputs to a multiplexer. The first control circuit is for receiving a first clock signal, generating a first toggling pulse, and enabling the write registers according to a sequence. The second control circuit is for controlling the multiplexer according to the first toggling pulse and a second clock. The multiplexer outputs a second output according to the sequence. The first and second clock signals have a first delay time and a second delay time, respectively. Difference between the first and second delay times is equal to M cycle(s) of the first clock signal, and a number of the write registers is equal to or larger than M.

13 Claims, 8 Drawing Sheets

FIRST IN AND FIRST OUT APPARATUS AND DRIVING METHOD THEREOF

BACKGROUND

Field of Invention

The present disclosure relates to a first in and first out device (FIFO). More particularly, the present disclosure relates to a FIFO device crossing different clock domains.

Description of Related Art

Figure 1:
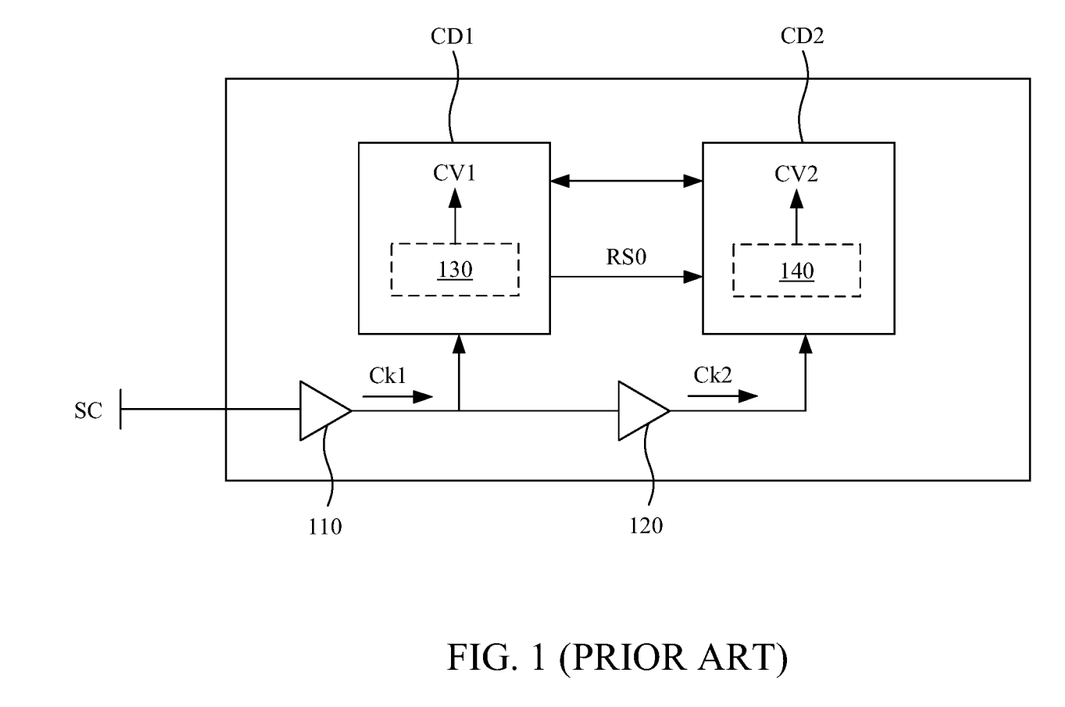
FIG. 1 is a schematic diagram of an IC divided into different clock domains.

In digital circuits, clock signals and counters are widely used to control the cooperation between circuits of different clock domains. As shown in FIG. 1, for example, an IC includes a first clock domain CD1 and a second clock domain CD2. The first clock domain CD1 is supplied with a first clock signal Ck1 outputted by a first delay unit 110, and the second clock domain CD2 is supplied with a second clock signal Ck2 outputted by a second delay unit 120. The first delay unit 110 and the second delay unit 120 are used to illustrate latency of a clock tree generated from the source clock signal SC. The components of the first clock domain CD1 transmit/receive data signals to/from the components of the second clock domain CD2 according to a sequence. The sequence is determined by first and second counting values CV1 and CV2 generated respectively by counter 130 of the first clock domain CD1 and counter 140 of the second clock domain CD2. When the counter 130 of the first clock domain CD1 is reset, the first clock domain CD1 transmits a reset signal RS0 to reset the counter 140 of the second clock domain CD2. However, when the source clock signal SC is temporarily switched to a power-off status for power saving, the first clock signal Ck1 and the second clock signal Ck2 may not stop or start to oscillate synchronously.

Figure 2:
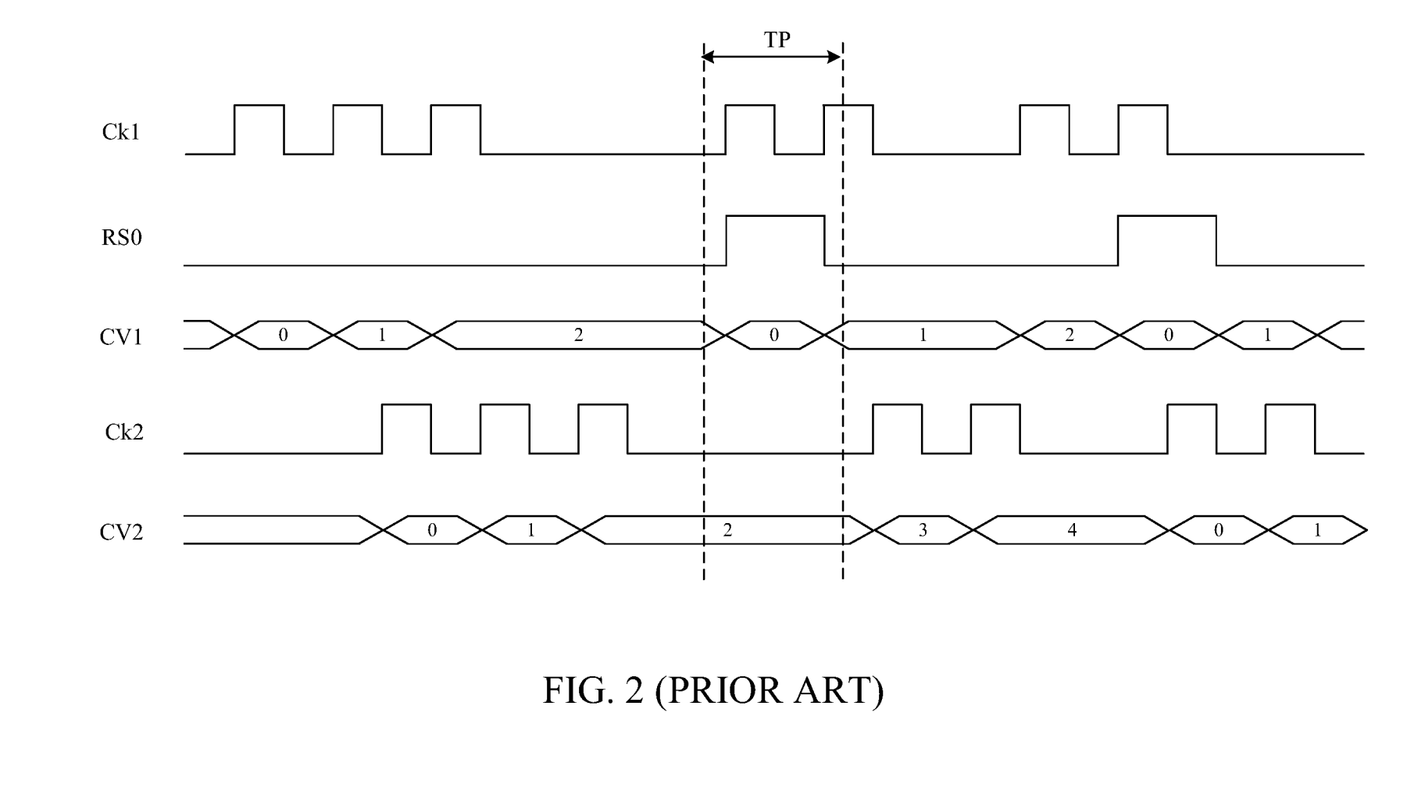
FIG. 2 is a timing diagram of the IC shown in FIG. 1.

As shown in FIG. 2, when the first clock signal Ck1 restarts to oscillate during a time period TP, the second clock signal Ck2 still remains at a fixed voltage level for one or more cycles. As a result, the components of the second clock domain CD2 cannot sample the pulse of the reset signal RS0 during the pulse period, and thus the counter 140 of the second clock domain CD2 overflows and outputs the erroneous counting values 3 and 4.

SUMMARY

The disclosure provides a first in and first out (FIFO) apparatus, configured to receive a first clock signal in a first clock domain, and to receive a second clock signal in a second clock domain, includes multiple write registers, a first control circuit, a multiplexer, and a second control circuit. The write registers is configured to receive an input signal and the first clock signal. Each of the write registers is configured to output a first output. The first control circuit is configured to receive the first clock signal, to generate a first toggling pulse, and to enable the write registers according to a sequence. The multiplexer is configured to receive the multiple first outputs. The second control circuit is configured to control the multiplexer according to the first toggling pulse and the second clock signal. The multiplexer outputs a second output according to the sequence. The first clock signal has a first delay time compared to a source clock signal, the second clock signal has a second delay time compared to the source clock signal, a difference between the first delay time and the second delay time is approximately equal to M cycles of the source clock signal, M is a positive integer, and a number of the write registers is equal to or larger than M.

The disclosure further provides a driving method, suitable for a first in and first out (FIFO) apparatus. The FIFO apparatus is configured to receive a first clock signal in a first clock domain, and to receive a second clock signal in a second clock domain. The method includes the following operations: utilizing multiple write registers to receive an input signal and the first clock signal, and each of the write registers is configured to output a first output; utilizing a first control circuit to generate a first toggling pulse and enable the write registers according to a sequence, and the first control circuit is configured to receive the first clock signal; utilizing a multiplexer to receive the multiple first signals; utilizing a second control circuit to control the multiplexer according to the first toggling pulse and the second clock signal. The multiplexer outputs a second output according to the sequence. The first clock signal has a first delay time compared to a source clock signal, the second clock signal has a second delay time compared to the source clock signal, and a difference between the first delay time and the second delay time is approximately equal to M cycles of the source clock signal. M is a positive integer, and a number of the write registers is equal to or larger than M.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 3:
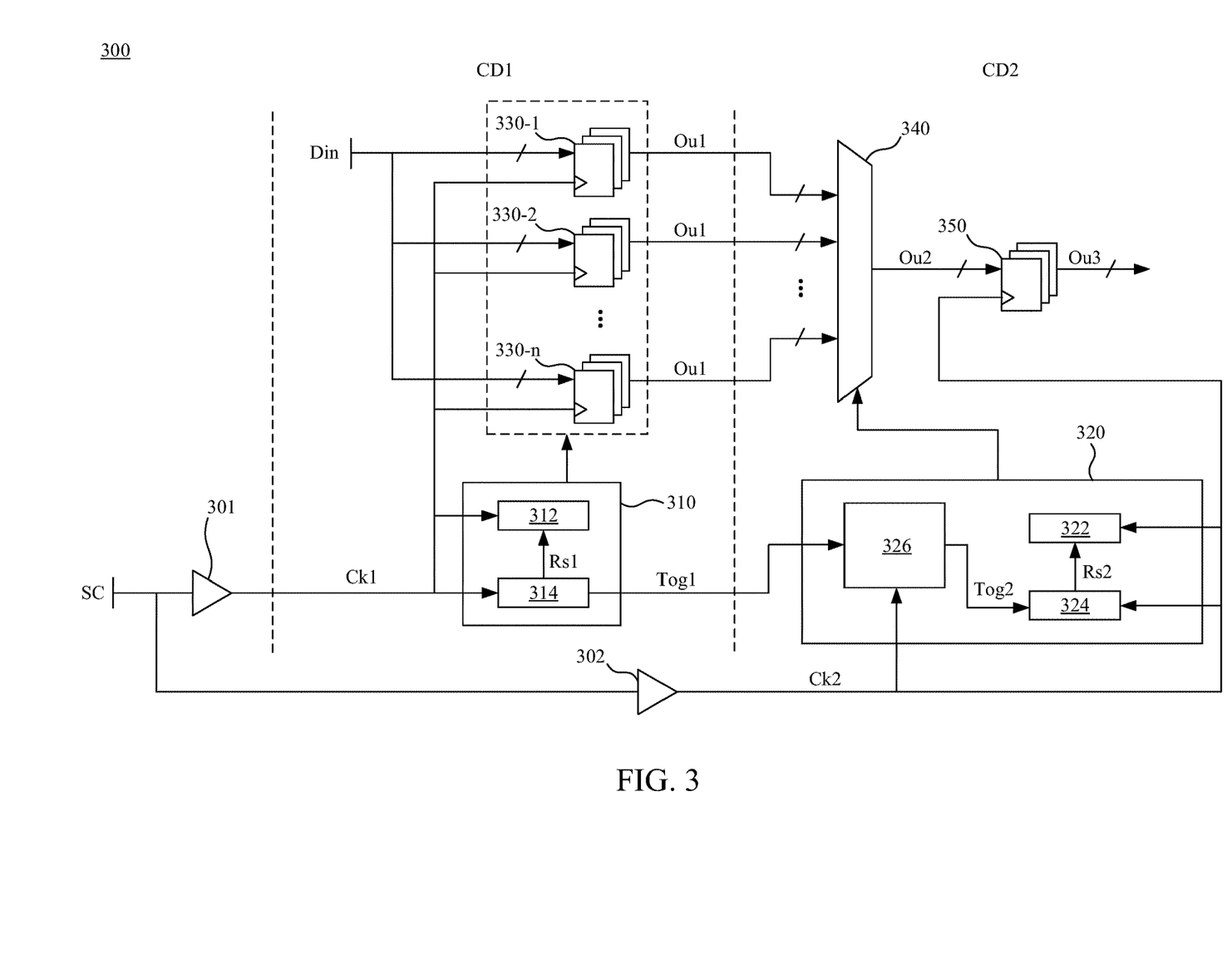
FIG. 3 is a simplified block diagram of a first in and first out (FIFO) apparatus according to one embodiment of the present disclosure.

FIG. 3 is a simplified block diagram of a first in and first out (FIFO) apparatus 300 according to one embodiment of the present disclosure. The FIFO apparatus 300 comprises a first control circuit 310, a second control circuit 320, multiple write registers 330-1~330-n, a multiplexer 340, and a read register 350. For the sake of brevity, other functional blocks of the FIFO apparatus 300 are not shown in FIG. 3.

Throughout the specification and drawings, indexes 1~n may be used in the reference labels of components and units for ease of referring to respective components and signals. The use of indexes 1~n does not intend to restrict the amount of components and units to any specific number.

The FIFO apparatus 300 crosses a first clock domain CD1 and a second clock domain CD2. The components of the first clock domain CD1 are supplied with a first clock signal Ck1 outputted by a first delay unit 301, and the components of the second clock domain CD2 are supplied with a second clock signal Ck2 outputted by a second delay unit 302. The first clock signal Ck1 and the second clock signal Ck2 belong to a same clock tree generated from a source clock signal SC.

In some embodiments, the source clock signal SC is in a clock domain different from the first clock domain CD1 and the second clock domain CD2.

Figure 4:
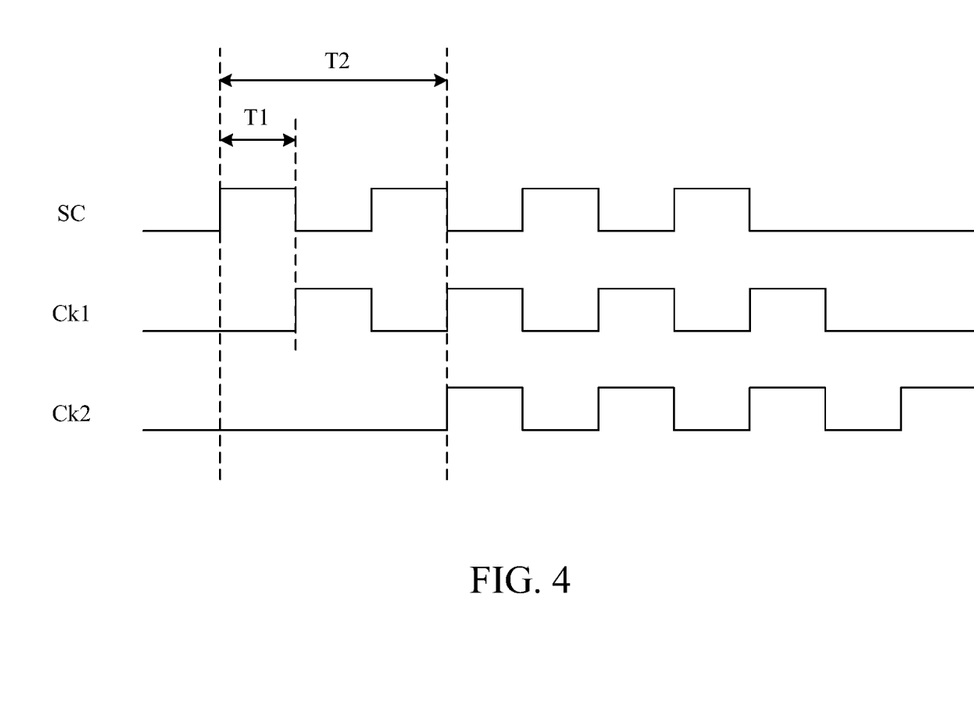
FIG. 4 depicts schematic waveforms of the source clock signal, the first clock signal, and the second clock signal according to one embodiment of the present disclosure.

FIG. 4 depicts schematic waveforms of the source clock signal SC, the first clock signal Ck1, and the second clock signal Ck2 according to one embodiment of the present disclosure. In the light of the first delay unit 301 and the second delay unit 302, the first clock signal Ck1 has a first delay time T1 compared to the source clock signal SC, and the second clock signal Ck2 has a second delay time T2 compared to the source clock signal SC. The first delay unit 301 and the second delay unit 302 are used to illustrate the latency of the first clock domain CD1 and the second clock domain CD2, respectively, and are not actual buffers or delay circuits of the FIFO apparatus 300.

Reference is made to FIG. 3, the write registers 330-1~330-n are configured to receive an input signal Din and the first clock signal Ck1, and each of the write registers 330-1~330-n is configured to output a first output Ou1. The input signal Din may be a data signal comprising one bit or a plurality of bits.

In some embodiments, the input signal Din is in the first clock domain CD1.

The first control circuit 310 is configured to receive the first clock signal Ck1, and to enable the write registers 330-1~330-n according to a sequence. For example, the write registers 330-1~330-n may sequentially receive the input signal Din, and also sequentially output the first outputs Ou1. The first control circuit 310 comprises a first counter 312 and a first reset circuit 314. The first counter 312 is configured to receive the first clock signal Ck1, and to count according to the sequence so that the first control circuit 310 enables one of the write registers 330-1~330-n corresponding to the counting value of the first counter 312.

The first reset circuit 314 is configured to output a first reset signal Rs1 to the first counter 312 to reset the first counter 312. The first reset circuit 314 is further configured to output a first toggling signal Tog1 to the second control circuit 320, so as to control the components belonging to the second clock domain CD2 to process the first outputs Ou1 according to the sequence.

The second control circuit 320 comprises a second counter 322, a second reset circuit 324, and an asynchronous interface 326. The asynchronous interface 326 is configured to delay the first toggling signal Tog1 to generate a second toggling signal Tog2, and the second toggling signal Tog2 is further transmitted to the second reset circuit 324. The second reset circuit 324 is configured to output a second reset signal Rs2 to the second counter 322 according to the second toggling signal Tog2, and the second reset signal Rs2 is used for resetting the second counter 322.

The second counter 322 is configured to count according to the sequence. The multiplexer 340 is configured to receive the first outputs Ou1. The second control circuit 320 is configured to control the multiplexer 340 to output one of the received first outputs Ou1, which is corresponding to the counting value of the second counter 322, as a second output Ou2.

The read register 350 is configured to output a third output Ou3 according to the second output Ou2 and the second clock signal Ck2. In practice, each of the read register 350 and the write registers 330-1~330-n is composed of at least one D flip-flop.

Figure 5:
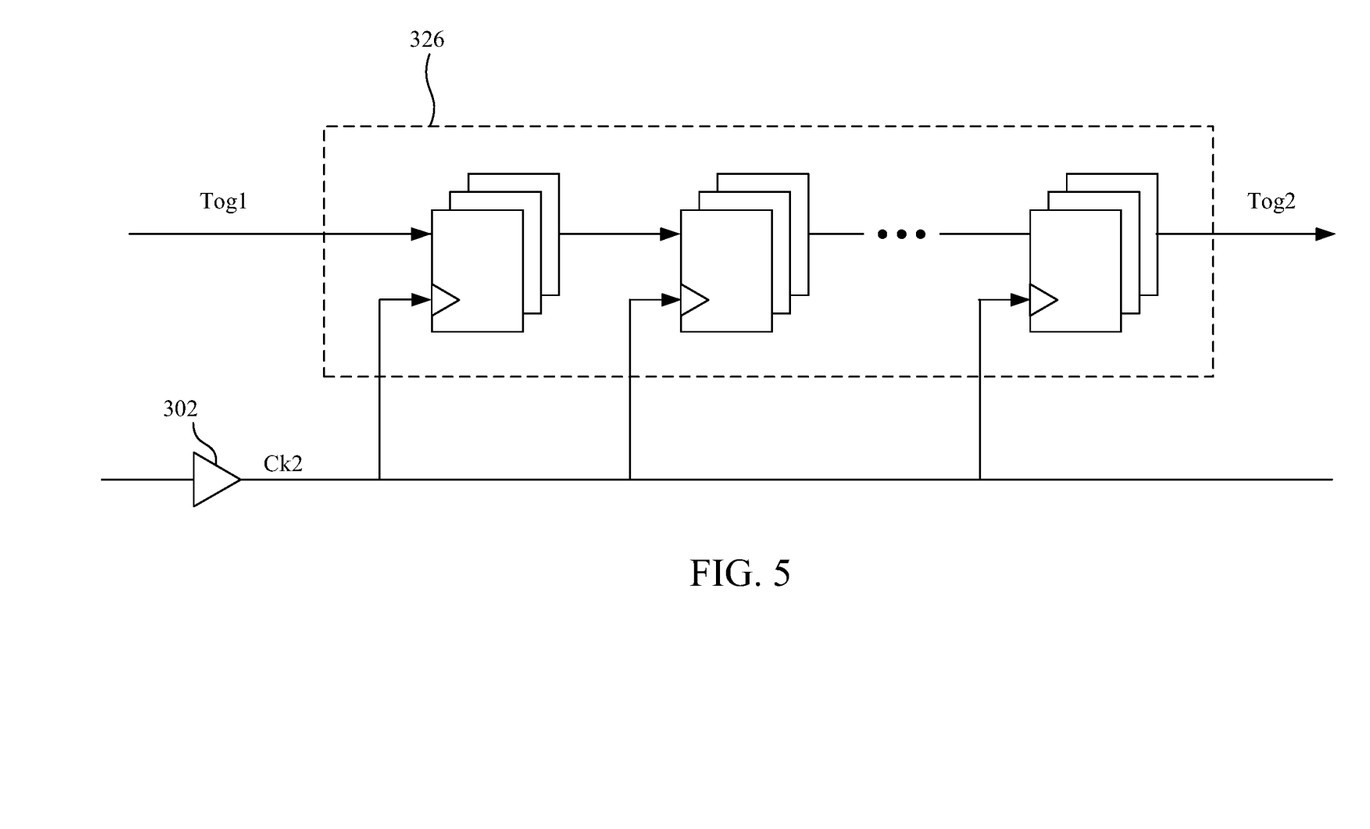
FIG. 5 is a simplified schematic diagram of the asynchronous interface according to one embodiment of the present disclosure.

FIG. 5 is a simplified schematic diagram of the asynchronous interface 326 according to one embodiment of the present disclosure. The asynchronous interface 326 comprises at least one D flip-flop driven by the second clock signal Ck2. A first node of the at least one D flip-flop is configured to receive the first toggling signal Tog1, and a second node of the at least one D flip-flop is configured to output the second toggling signal Tog2.

Figure 6:
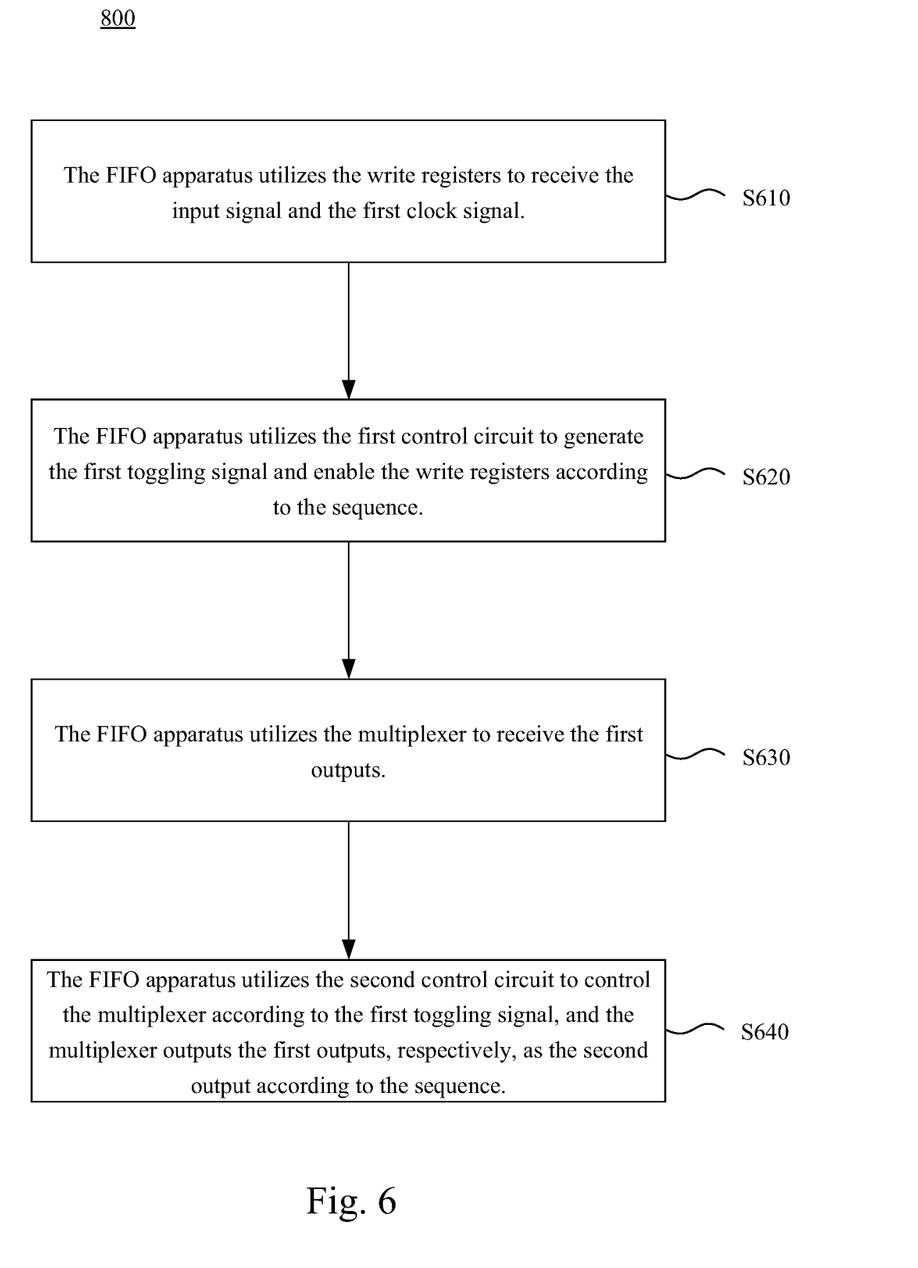
FIG. 6 is a flow chart of a driving method suitable for the FIFO apparatus according to one embodiment of the present disclosure.

FIG. 6 is a flow chart of a driving method 600 suitable for the FIFO apparatus 300 according to one embodiment of the present disclosure. The driving method 600 comprises operations S610 through S640. For the purpose of explanatory convenience, the FIFO apparatus 300 and the driving method 600 will be further described in the following by reference to embodiments comprising four write registers (i.e., n is equal to 4).

Figure 7:
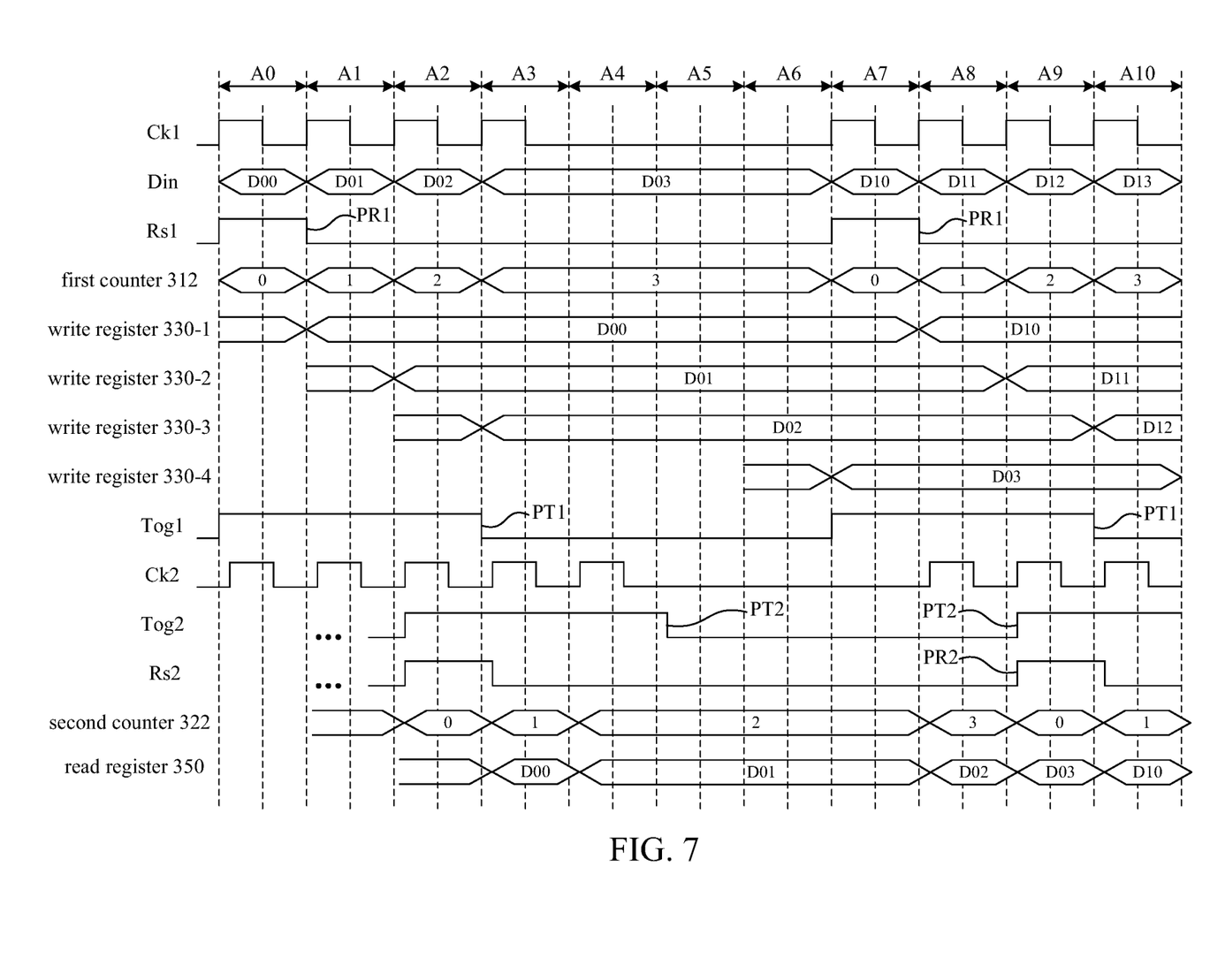
FIG. 7 is a timing diagram of the FIFO device where the second delay time of the second clock signal is longer than the first delay time of the first clock signal according to one embodiment of the present disclosure.

FIG. 7 is a timing diagram of the FIFO apparatus 300 where the second delay time T2 of the second clock signal Ck2 is longer than the first delay time T1 of the first clock signal Ck1 according to one embodiment of the present disclosure. Reference is made to FIGS. 6 and 7, in operation S610, the FIFO apparatus 300 utilizes the write registers 330-1~330-n to receive the input signal Din and the first clock signal Ck1.

In operation S620, the FIFO apparatus 300 utilizes the first control circuit 310 to generate the first toggling signal Tog1, and enables the write registers 330-1~330-n according to the sequence.

For example, in stage A0, the first reset circuit 314 applies a reset pulse PR1 to the first counter 312 through the first reset signal Rs1, so as to reset the counting value of the first counter 312 to 0. Therefore, the first control circuit 310 controls the write register 330-1 to receive the input signal Din (D00). In stage A1, the counting value of the first counter 312 is 1. Thus, the first control circuit 310 controls the write register 330-2 to receive the input signal Din (D01), while the write register 330-1 outputs the first output Ou1 (D00). In stage A2, the counting value of the first counter 312 is 2. Thus, the first control circuit 310 controls the write register 330-3 to receive the input signal Din (D02), while the write register 330-2 outputs the first output Ou1 thereof (D01).

When the first reset circuit 314 generates the first reset pulse PR1, the first reset circuit 314 also applies a first toggling pulse PT1 to the asynchronous interface 326 through the first toggling signal Tog1. The first reset circuit 314 is configured to determine the pulse width of the first toggling pulse PT1 by comparing the counted rising edge of the first clock signal Ck1 with a predetermined value. In this embodiment, the first toggling pulse PT1 would exist until the first reset circuit 314 has counted 3 rising edges of the first clock signal Ck1 from the time when the first toggling pulse PT1 is generated, namely, the predetermined value is 3, but the disclosure is not limited thereto. In some embodiments, the predetermined value is the depth, i.e., the number, of the multiple write registers 330-1~330-n subtracting 1. For example, in the situation that the number of the write registers 330-1-330-n is 4, the predetermined value is set as 3.

In operation S630, the FIFO apparatus 300 utilizes the multiplexer 340 to receive the first outputs Ou1.

In operation S640, the FIFO apparatus 300 utilizes the second control circuit 320 to control the multiplexer 340 according to the first toggling signal Tog1 and the second clock signal Ck2, and the multiplexer 340 outputs the first outputs Ou1, respectively, as the second output Ou2 according to the sequence.

For example, the asynchronous interface 326 delays the first toggling pulse PT1, for at least one cycle of the first clock signal Ck1 (or the second clock signal Ck2), to generate a second toggling pulse PT2. The second toggling pulse PT2 is further transmitted to the second reset circuit 324 through the second toggling signal Tog2. The second reset circuit 324 samples the second toggling signal Tog2, according to the second clock signal Ck2, to determine the waveform of the second reset signal Rs2. When the second reset circuit 324 receives the rising edge of the second toggling pulse PT2, the second reset circuit 324 supplies a second reset pulse PR2 to the second counter 322 to reset the counting value of the second counter 322 to 0.

In the embodiment of FIG. 7, for generating the second toggling signal Tog2, the asynchronous interface 326 delays the first toggling pulse PT1 for approximately two cycles of the first clock signal Ck1. Therefore, the counting value of the second counter 322 is 0 in stage A2, and the second control circuit 320 controls the multiplexer 340 to output the first output Ou1 (D00) of the write register 330-1 as the second output Ou2.

In the stage A3, the first control circuit 310 controls the write register 330-4 to receive the input signal Din (D03), and the write register 330-3 outputs the first output Ou1 (D02). The second control circuit 320 controls the multiplexer 340 to output the first output Ou1 (D01) of the write register 330-2 as the second output Ou2. In this stage, the read register 350 outputs the third output Ou3 (D00) according to the second output Ou2 received in stage A2. Because of the delay provided by the asynchronous interface 326, even though there is a phase difference existing between the first clock signal Ck1 and the second clock signal Ck2, the multiplexer 340 is still capable of following the sequence to select the desired first output Ou1.

In this embodiment, the source clock signal SC is switched to the power-off status temporarily, and thus the first clock signal Ck1 switched from an oscillating waveform to a fixed voltage level during stage A4. The first clock signal Ck1 remains at the fixed voltage level during stages A4 through A6. In this embodiment, the second delay time T2 is longer than the first delay time T1 for approximately 1 cycle of the source clock signal SC. Therefore, the second clock Ck2 would still oscillate in stage A4 and switched to be at the fixed voltage level in stage A5.

In stage A4, the second counter 322 generates the counting value 2 so that the second control circuit 320 controls the multiplexer 340 to output the first output Ou1 (D02) of the write register 330-3 as the second output Ou2. Since the number of the write registers 330-1~330-n is larger than the number of cycles for which the second clock signal Ck2 oscillates after the first clock signal Ck1 is switched to be at the fixed voltage level, the multiplexer 340 does not output the first output Ou1 that has not had a stable or desired value (e.g., the first output Ou1 of the write register 330-4).

In other words, the difference between the first delay time T1 and the second delay time T2 is approximately equal to M cycle(s) of the source clock signal SC, and M is a positive integer. The number of the write registers 330-1~330-n is set to be equal to or larger than M. For example, in the embodiment of FIG. 7, M is 1 and the number of the write registers 330-1~330-n is 4.

In stage A7, the first clock signal Ck1 is switched from the fixed voltage level to an oscillating waveform. The first reset circuit 314 provides the first reset pulse PR1 to the first counter 312 to reset the counting value thereof to 0. As a result, the first control circuit 310 controls the write register 330-1 to read the input signal Din (D10), and the write register 330-4 outputs the first output Ou1 (D03).

As aforementioned, the first toggling pulse PT1 would exist until the first reset circuit 314 has counted 3 rising edges of the first clock signal Ck1 from the time when the first toggling pulse PT1 is generated, and thus the first toggling pulse PT1 extends from stage A7 to stage A9. As a result, the first toggling pulse PT1 can be sampled by the asynchronous interface 326 when the second control signal Ck2 restarts to oscillate in stage A8. In stage A9, the asynchronous interface 326 provides the second toggling pulse PT2 to the second reset circuit 324 so that the second reset circuit 324 provides the second reset pulse PR2 to the second counter 322.

In other words, when the first clock signal Ck1 has an oscillating waveform, and the second clock signal has a fixed voltage level, the first toggling signal Tog1 switches from a disabling voltage level to an enabling voltage level. The first toggling signal Tog1 maintains at the enabling voltage level until at least when the second clock signal Ck2 switches from the fixed voltage level to the oscillating waveform.

Accordingly, the difference between the first delay time T1 and the second delay time T2 is approximately equal to M cycle(s), e.g., 1 cycle, of the source clock signal SC. The first toggling pulse PT1 exists until the first reset circuit 314 has counted N rising edges, e.g., 3 rising edges, of the first clock signal Ck1 from the time when the first toggling pulse PT1 is generated. M and N are positive integers, and N is larger than M to ensure that the first toggling pulse PT1 can be sampled by the asynchronous interface 326.

Figure 8:
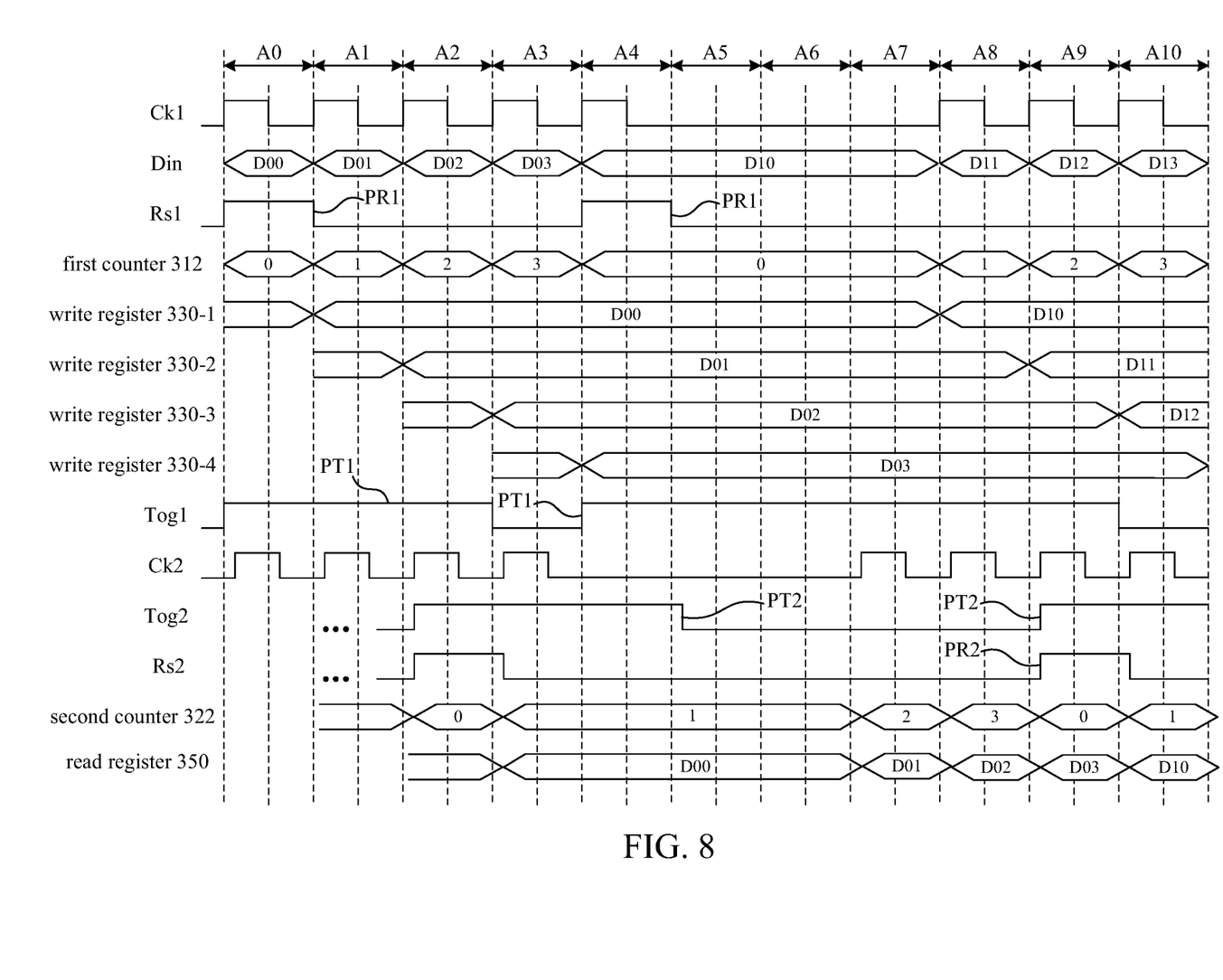
FIG. 8 is a timing diagram of the FIFO device where the first delay time of the first clock signal is longer than the second delay time of the second clock signal according to one embodiment of the present disclosure.

FIG. 8 is a timing diagram of the FIFO apparatus 300 according to another embodiment of the present disclosure. The embodiment of FIG. 8 is similar to the embodiment of FIG. 7, and the difference is that the first delay time T1 of the first clock signal Ck1 is longer than the second delay time T2 of the second clock signal Ck2. In this embodiment, when the source clock signal SC is switched to the power-off status temporarily, the second clock signal Ck2 switched from an oscillating waveform to a fixed voltage level during stage A4. Since the first delay time T1 is longer than the second delay time T2 for approximately 1 cycle of the source clock signal SC, the first clock Ck1 would still oscillate in stage A4, and switches the fixed voltage level in stage A5.

In stage A4, the first reset circuit 314 applies the first reset pulse PR1 to the first counter 312, and also applies the first toggling pulse PT1 to the asynchronous interface 326. To ensure that the first toggling pulse PT1 can be sampled by the asynchronous interface 326, the first reset circuit 314 provides the first toggling pulse PT1 until the first reset circuit 314 has counted 3 rising edges of the first clock signal Ck1 from when the first toggling pulse PT1 is generated.

Therefore, even though the second clock signal Ck2 switches to the fixed voltage level when the first toggling pulse PT1 is generated, the first toggling pulse PT1 can still be sampled by the asynchronous interface 326 in stage A7. As a result, the asynchronous interface 326 generates the second toggling pulse PT2 in stage A9.

In this embodiment, the number of the write registers 330-1~330-n is 4, and number of cycles corresponding to the difference between the first delay time T1 and the second delay time T2 is approximately 1. Since the number of the write registers 330-1~330-n is larger than the said number of cycles, the output of the multiplexer 340 is not affected by the operations conducted by the components of the first clock domain CD1 when the second clock signal Ck2 has a fixed voltage level. In addition, the first output Ou1, having data that has not been outputted by the multiplexer 340, will also not be updated. As a result, problems corresponding to data loss can be obviated.

For example, the write register 330-1 is controlled by the first control circuit 310 to receive the input signal Din (D10) in stage A4, and the first control circuit 310 suspends the operation from stage A5 through stage A6. Therefore, the output of the multiplexer 340, which is the first output Ou1 (D01) of the write register 330-2, would not be affected from stage A3 to stage A6. The input and output status of the write registers 330-3 would not be updated from stage A3 to stage A9, so that the first output Ou1 (D02) of the write register 330-3 is outputted by the multiplexer 340 in stage A7 when the second clock signal Ck2 restarts to oscillate. Similarly, the write registers 330-4 would not be updated from stage A4 to stage A10, so that the first output Ou1 (D03) of the write register 330-4 is outputted by the multiplexer 340 in stage A8.

As can be appreciated from the foregoing descriptions, the FIFO apparatus 300 and the driving method 600 can prevent erroneous output by increasing the depth of the write register group, and by extending the pulse for resetting the counter of the different clock domains.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A first in and first out (FIFO) apparatus, configured to receive a first clock signal in a first clock domain, and to receive a second clock signal in a second clock domain, the FIFO apparatus comprising:
   multiple write registers, configured to receive an input signal and the first clock signal, wherein each of the write registers is configured to output a first output;
   a first control circuit, configured to receive the first clock signal, to generate a first toggling pulse, and to enable the write registers according to a sequence;
   a multiplexer, configured to receive the multiple first outputs; and
   a second control circuit, configured to control the multiplexer according to the first toggling pulse and the second clock signal, wherein the multiplexer outputs a second output according to the sequence,
   wherein the first clock signal has a first delay time compared to a source clock signal, the second clock signal has a second delay time compared to the source clock signal, a difference between the first delay time and the second delay time is approximately equal to M cycle(s) of the source clock signal, M is a positive integer, and a number of the write registers is equal to or larger than M.

2. The FIFO apparatus of claim 1, wherein the first control circuit comprises:
   a first counter, configured to count according to the sequence; and
   a first reset circuit, configured to output a first reset pulse to the first counter so that the first counter restarts counting,
   wherein when the first reset circuit outputs the first reset pulse, the first reset circuit outputs the first toggling pulse.

3. The FIFO apparatus of claim 2, wherein the first reset circuit is further configured to determine a pulse width of the first toggling pulse by counting a rising edge of the first clock signal,
   wherein the first toggling pulse exists until the first reset circuit has counted N rising edges of the first clock signal from a time that the first toggling pulse is generated, N is a positive integer, and N is larger than M.

4. The FIFO apparatus of claim 2, wherein the second control circuit further comprises:
   a second counter, configured to count according to the sequence; and
   a second reset circuit, configured to output a second reset pulse to the second counter according to a second toggling pulse so that the second counter restarts counting.

5. The FIFO apparatus of claim 1, wherein the second control circuit comprises:
   an asynchronous interface, configured to generate a second toggling pulse according to the first toggling pulse,
   wherein the first toggling pulse is transmitted through a first toggling signal, and the second toggling pulse is transmitted through a second toggling signal,
   when the first clock signal has an oscillating waveform and the second clock signal is at a fixed voltage level, the first toggling signal switches from a disabling voltage level to an enabling voltage level, and the first toggling signal maintains at the enabling voltage level until the second clock signal switches from the fixed voltage level to the oscillating waveform.

6. The FIFO apparatus of claim 5, wherein the asynchronous interface comprises:
   at least one D flip-flop, configured to receive the second clock signal, and comprising a first node and a second node, wherein the first node of the at least one D flip-flop is configured to receive the first toggling signal, and the second node of the at least one D flip-flop is configured to output the second toggling signal.

7. The FIFO apparatus of claim 1, wherein each of the write registers is a D flip-flop.

8. A driving method, suitable for a first in and first out (FIFO) apparatus, wherein the FIFO apparatus is configured to receive a first clock signal in a first clock domain, and to receive a second clock signal in a second clock domain, comprising:
   utilizing multiple write registers to receive an input signal and the first clock signal, wherein each of the write registers is configured to output a first output;

utilizing a first control circuit to generate a first toggling pulse and enable the write registers according to a sequence, wherein the first control circuit is configured to receive the first clock signal;

utilizing a multiplexer to receive the multiple first signals; and utilizing a second control circuit to control the multiplexer according to the first toggling pulse and the second clock signal, wherein the multiplexer outputs a second output according to the sequence, wherein the first clock signal has a first delay time compared to a source clock signal, the second clock signal has a second delay time compared to the source clock signal, a difference between the first delay time and the second delay time is approximately equal to M cycle(s) of the source clock signal, M is a positive integer, and a number of the write registers is equal to or larger than M.

9. The driving method of claim 8, wherein the operation of utilizing the first control circuit to generate the first toggling pulse and enable the write registers according to the sequence comprises:

utilizing a first counter to count according the sequence so that the first control circuit enable the write registers according to the sequence;

utilizing a first reset circuit to output a first reset pulse to the first counter so that the first counter restarts counting; and when the first reset circuit outputs the first reset pulse, utilizing the first reset circuit to output the first toggling pulse.

10. The driving method of claim 9, wherein the operation of when the first reset circuit outputs the first reset pulse, utilizing the first reset circuit to output the first toggling pulse comprises:

utilizing the first reset circuit to determine a pulse width of the first toggling pulse by counting a rising edge of the first clock signal, wherein the first toggling pulse exists until the first reset circuit has counted N rising edges of the first clock signal from a time that the first toggling pulse is generated, N is a positive integer, and N is larger than M.

11. The driving method of claim 9, wherein the second control circuit comprises a second counter and a second reset circuit, and the operation of utilizing the second control circuit to control the multiplexer according to the first toggling pulse further comprises:

utilizing the second counter to count according to the sequence so that the multiplexer outputs the multiple first outputs, respectively, as a second output according to the sequence; and utilizing the second reset circuit to output a second reset pulse to the second counter according to a second toggling pulse so that the second counter restarts counting.

12. The driving method of claim 8, wherein the second control circuit comprises an asynchronous interface, and the operation of utilizing the second control circuit to control the multiplexer according to the first toggling pulse comprises:

utilizing the asynchronous interface to generate a second toggling pulse according to the first toggling pulse, wherein the first toggling pulse is transmitted through a first toggling signal, and the second toggling pulse is transmitted through a second toggling signal, when the first clock signal has an oscillating waveform and the second clock signal is at a fixed voltage level, the first toggling signal switches from a disabling voltage level to an enabling voltage level, and the first toggling signal maintains at the enabling voltage level until the second clock signal switches from the fixed voltage level to the oscillating waveform.

13. The driving method of claim 12, wherein the asynchronous interface comprises at least one D flip-flop, and the operation of utilizing the asynchronous interface to generate the second toggling pulse according to the first toggling pulse comprises:

utilizing the at least one D flip-flop to receive the second clock signal;

utilizing a first node of the at least one D flip-flop to receive the first toggling signal; and utilizing a second node of the at least one D flip-flop to output the second toggling signal.

* * * * *